(12) United States Patent
Collins et al.

(10) Patent No.: US 7,397,677 B1
(45) Date of Patent: Jul. 8, 2008

(54) APPARATUS AND METHOD FOR CHARGE PUMP CONTROL WITH ADJUSTABLE SERIES RESISTANCE

(75) Inventors: Michael John Collins, Longmont, CO (US); Richard Frank, Longmont, CO (US)

(73) Assignee: National Semiconductor Corporation, Santa Clara, CA (US)

(*) Notice: Subject to any disclaimer, the term of this patent is extended or adjusted under 35 U.S.C. 154(b) by 194 days.

(21) Appl. No.: 11/350,674

(22) Filed: Feb. 8, 2006

(51) Int. Cl.
*H02M 3/18* (2006.01)
*G05F 1/62* (2006.01)

(52) U.S. Cl. .................. 363/60; 323/271; 327/536

(58) Field of Classification Search .......... 363/59, 363/60; 323/225, 271; 327/536
See application file for complete search history.

(56) References Cited

U.S. PATENT DOCUMENTS 6,411,531 B1 * 6/2002 Nork et al. .............. 363/60
6,664,829 B1   12/2003 Hughes
6,717,458 B1   4/2004 Potanin

OTHER PUBLICATIONS

Park, S. et al., "A Self-Boost Charge Pump Topology for a Gate Drive High-Side Power Supply," IEEE, pp. 126-131 (2003).
Rao, A. et al., "Buck-Boost Switched-Capacitor DC-DC Voltage Regulator Using Delta-Sigma Control Loop," IEEE, 4:743-746 (2002).
Starzyk, J. et al., "A DC-DC Charge Pump Design Based on Voltage Doublers," IEEE, 48(3):350-359 (2001).
"Triple-Output TFT-LCD DC-DC Converters," Maxim Integrated Products, pp. 1-16 (2004).

* cited by examiner

*Primary Examiner*—Gary L Laxton
(74) *Attorney, Agent, or Firm*—Darby & Darby P.C.; Matthew M. Gaffney

(57) ABSTRACT

A charge pump is provided. The charge pump may include an oscillator, a first switch, a second switch, a capacitor/switch network, an error amplifier, an adjustable resistance circuit, a first switch driver, and a second switch driver. In one embodiment, the first and second drivers each receive the oscillator voltage, and drive the first and second switches, respectively. Further, the adjustable resistance circuit is connected in series with the first and second switch circuits. The charge pump is arranged in a closed loop with the error amplifier driving the adjustable resistance circuit. The resistance of the adjustable resistance circuit is modulated to regulate the output voltage.

24 Claims, 10 Drawing Sheets

APPARATUS AND METHOD FOR CHARGE PUMP CONTROL WITH ADJUSTABLE SERIES RESISTANCE

FIELD OF THE INVENTION

The invention is related to charge pumps, and in particular, to an apparatus and method for a charge pump in which the voltage is regulated by employing an adjustable resistance circuit that is connected in series with the switches and driven by an error amplifier.

BACKGROUND OF THE INVENTION

A charge pump typically employs switched capacitor(s) for voltage conversion. For example, a voltage doubler type charge pump typically operates as follows. During a first phase, a flying capacitor is switched to sample a voltage, e.g., the voltage between the power supplies. During a second phase, the flying capacitor is switched so that the bottom terminal of the flying capacitor is coupled to the power supply voltage, and the top terminal is connected to the output capacitor. Accordingly, the voltage doubler provides an output voltage that is greater than the supply voltage.

BRIEF DESCRIPTION OF THE DRAWINGS

Non-limiting and non-exhaustive embodiments of the present invention are described with reference to the following drawings, in which.

DETAILED DESCRIPTION

Figure 1:
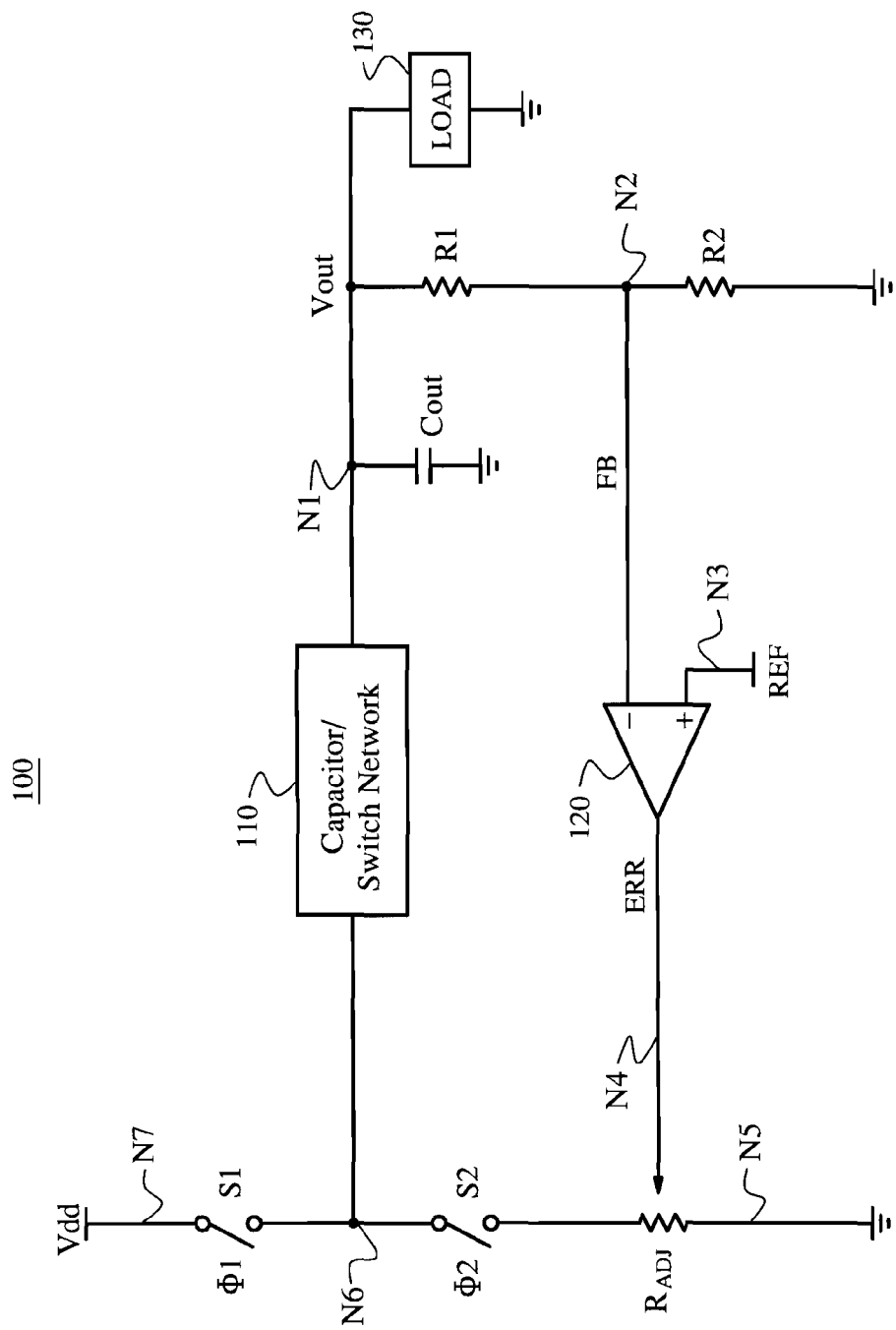
FIG. 1 shows a block diagram of an embodiment of a charge pump circuit.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar transistor may be employed as an embodiment of a transistor, the scope of the words "gate", "drain", and "source" includes "base", "collector", and "emitter", respectively, and vice versa.

Briefly stated, the invention is related to a charge pump that may include an oscillator, a first switch, a second switch, a capacitor/switch network, an error amplifier, an adjustable resistance circuit, a first switch driver, and a second switch driver. In one embodiment, the first and second drivers each receive the oscillator voltage, and drive the first and second switches, respectively. Further, the adjustable resistance circuit is connected in series with the first and second switch circuits. The charge pump is arranged in a closed loop with the error amplifier driving the adjustable resistance circuit. The resistance of the adjustable resistance circuit is modulated to regulate the output voltage.

FIG. 1 shows a block diagram of an embodiment of charge pump circuit 100. Charge pump circuit 100 may include error amplifier 120, adjustable resistance circuit Radj, switch circuit S1, switch circuit S2, capacitor/switch network 110, output capacitor Cout, resistor R1, resistor R2, and load 130.

In operation, charge pump circuit 100 provides output voltage Vout at node N1. Resistors R1 and R2 may operate as a voltage divider to provide feedback signal FB at node N2 responsive to output voltage Vout. Further, error amplifier 120 is operable to provide an error signal ERR at node N4 responsive to signal FB and reference signal REF (received at node N3). Adjustable resistance circuit Radj has a resistance that is modulated based on signal ERR.

The switch circuits—including switch circuit S1, S2, and switch circuits in capacitor/switch network 110—open and close according to at least two phases, phase φ1 and phase φ2. Also, capacitor/switch network 110 includes a flying capacitor (not shown in FIG. 1). The switch circuits are arranged and controlled such that, in phase φ2, the flying capacitor is coupled in series with adjustable resistance circuit Radj, and such that the series combination of the flying capacitor and adjustable resistance circuit Radj is coupled between node N7 and node N5. In one embodiment, node N7 is a high power supply voltage node for receiving supply voltage VDD and node N5 is a low power supply node connected to ground (or VSS). The supply voltage is interchangeably referred to as VDD or Vs in this document.

During phase φ2, the flying capacitor samples a voltage that is approximately given by: the voltage between nodes N7 and N5, minus the voltage drop across adjustable resistance circuit Radj. During phase φ1, the switch circuits are controlled so that charge is transferred from the flying capacitor to output capacitor Cout, or vice versa, for providing output voltage Vout. Phase φ1 acts as a hold phase and phase φ2 acts as a sample phase. The arrangement that occurs in phase φ1 may be different in various embodiments, as described in greater detail below. During phase φ2, the flying capacitor is not supplying charge to output node N1, but output capacitor Cout causes the voltage at node N1 to be maintained at the substantially the same level as it was at the end of the last phase φ1.

Charge pump circuit 100 operates to regulate output voltage Vout by modulating adjustable resistance circuit Radj. If output voltage Vout is less than the steady-state value, the resistance of adjustable resistance circuit Radj is decreased, which in turn increases the flying capacitor voltage. Conversely, if output voltage Vout is greater than the steady-state value, the resistance of adjustable resistance circuit Radj is increased, which in turn decreases the flying capacitor voltage.

In one embodiment, error amplifier 120, switch circuit S1, switch circuit S2, and adjustable resistance circuit Radj are all included on an integrated circuit, while resistor R1, resistor R2, load 130, and capacitor/switch network 110 are external to the integrated circuit. In another embodiment, the switch circuits in capacitor/switch network 110 are on-chip and the flying capacitor is off-chip.

In one embodiment, error amplifier 120 is an operational amplifier with built-in loop compensation. In another embodiment, error amplifier 120 is a simple gm amplifier. In this embodiment, compensation can be performed with a simple compensation circuit coupled to node N4. Because node N4 is a high impedance node, it is suitable for loop compensation.

Figures 2A, 2B:
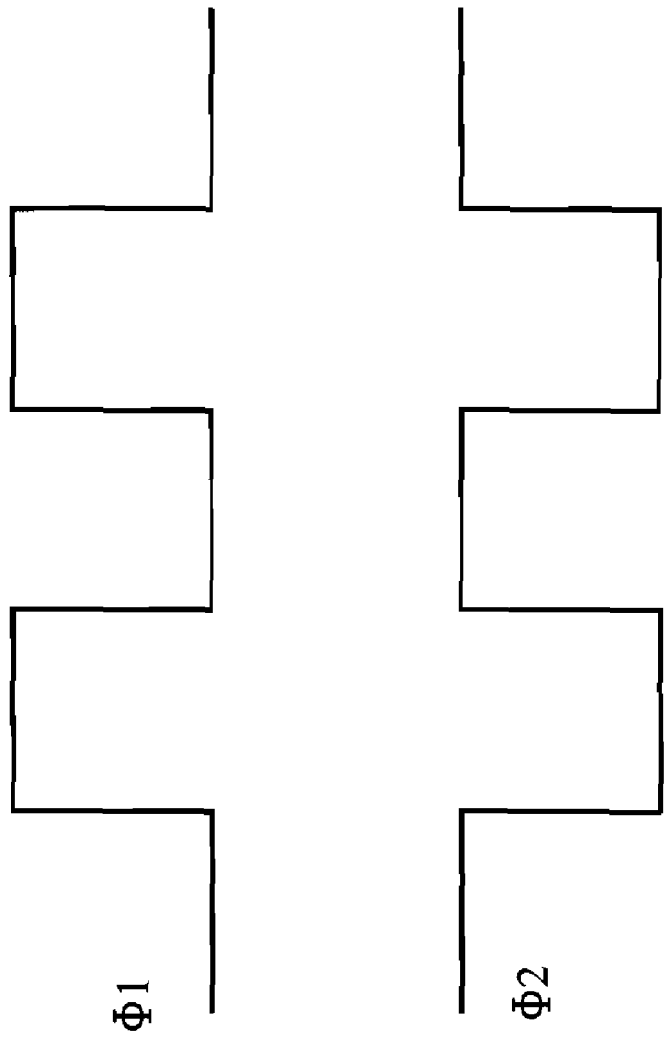
FIG. 2A illustrates a timing diagram of a waveform for phase φ1 for an embodiment the charge pump circuit of FIG. 1.
FIG. 2B illustrates a timing diagram of a waveform for phase φ2 for an embodiment the charge pump circuit of FIG. 1.

FIGS. 2A and 2B illustrate timing diagrams of waveforms for phases φ1 and φ2 respectively for an embodiment charge pump circuit 100 of FIG. 1. As shown in FIG. 2A, during phase φ1, switch circuit S1 is on and switch circuit S2 is off. As shown in FIG. 2B, during phase φ2, switch circuit S2 is on and switch circuit S1 is off. As shown, phases φ1 and φ2 may be provided employing two signals out of phase with each other operating at 50% duty cycle, provided by an oscillator or the like. In another embodiment, one signal is used for controlling phase φ1 and phase φ2 for each of the switch circuits.

Although FIG. 1 shows one arrangement for an embodiment of charge pump circuit 100, other circuits may be arranged in a different manner. For example, in one embodiment, adjustable resistance circuit Radj may be placed in a different location than shown in FIG. 1, having a different arrangement than the one illustrated in FIG. 1 in which adjustable resistance circuit Radj is also coupled in series with the flying capacitor during the sampling phase. For example, in other embodiments, the position of switch circuit S2 and adjustable resistance circuit Radj may be reversed, adjustable resistance circuit Radj may be placed next to a high-side switch rather than a low-side switch, or the like.

As another example, although charge pump circuit 100 illustrates an embodiment in which charge pump 100 is used for voltage regulation, in other embodiments, a current may be regulated rather than a voltage.

Figure 3:
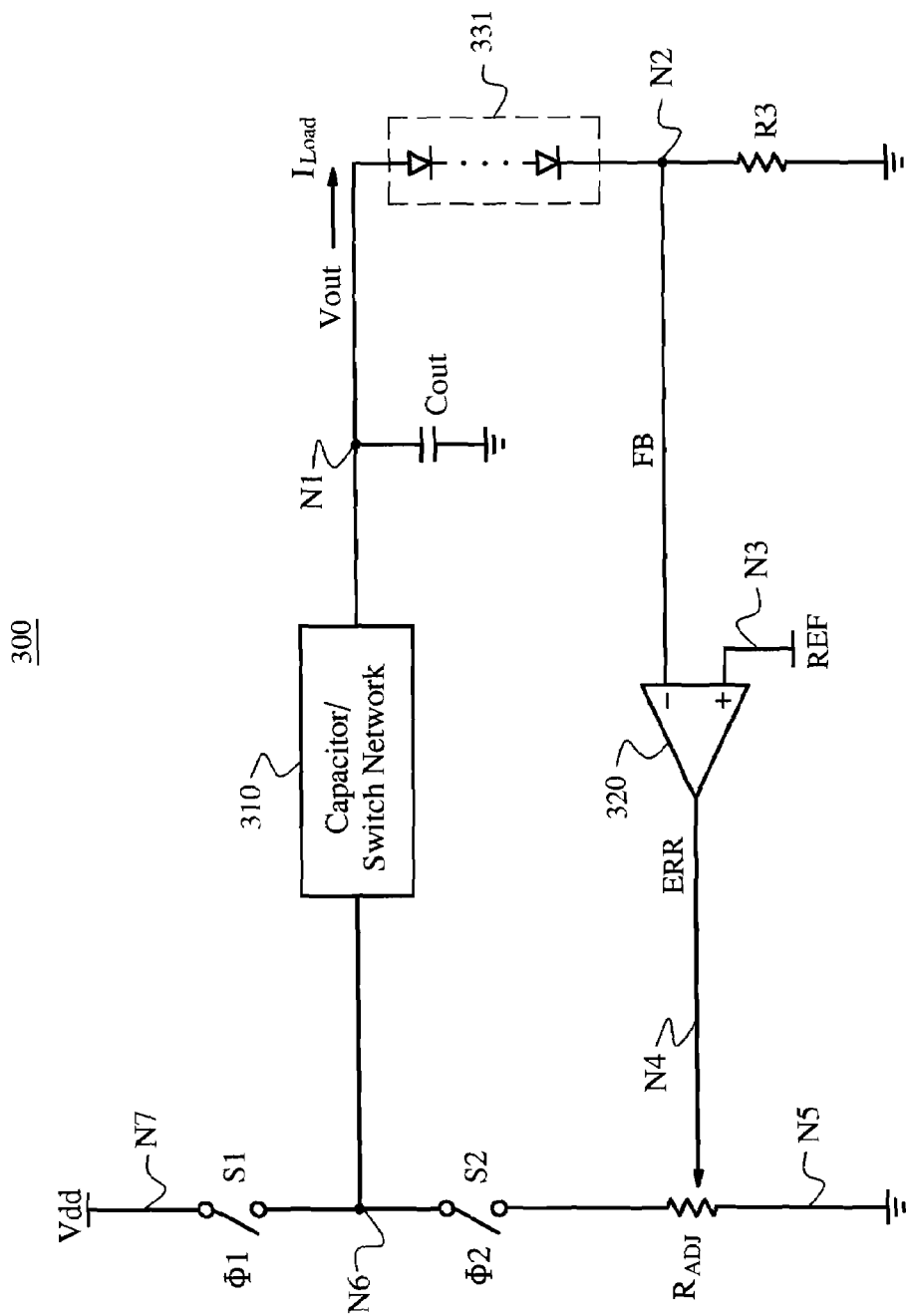
FIG. 3 shows a block diagram of an embodiment of the charge pump circuit of FIG. 1 in which load current is regulated.

For example, FIG. 3 shows a block diagram of an embodiment of charge pump circuit 300, which is an embodiment of charge pump circuit 100 of FIG. 1 in which load voltage Iload is regulated. Charge pump circuit 300 further includes resistor R3 and load 331. In one embodiment, load 331 is a string of white LEDs coupled in series.

Also, virtually any type of charge pump arrangement may be employed within the scope and spirit of the invention. As one example, a voltage doubler type architecture may be used to provide a regulated output voltage Vout that is between 1x and 2x, where x represents the voltage at node N7 minus the voltage at node N5.

Figure 4:
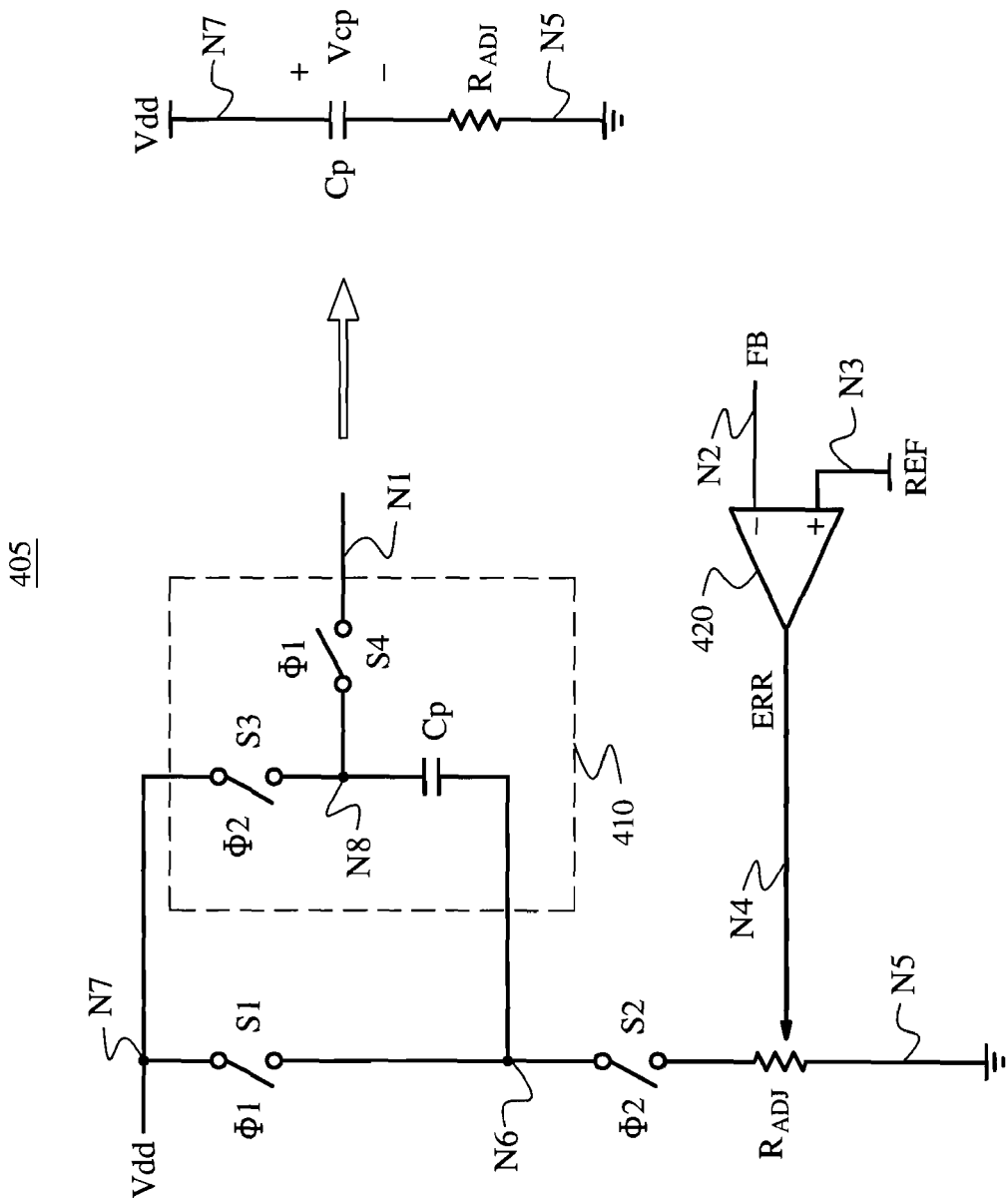
FIG. 4 illustrates a block diagram of an embodiment of a portion of an embodiment of the charge pump circuit of FIG. 1 in which a voltage doubler architecture is employed.

FIG. 4 illustrates a block diagram of portion 405 of an embodiment of charge pump 100 in which a voltage doubler architecture is employed. Capacitor/switch network 410 includes switch circuit S3, switch circuit S4, and flying capacitor Cp. Flying capacitor Cp is coupled between first flying capacitor node N6 and second flying capacitor node N8. Switch circuit S3 is closed during phase φ2 and open during phase φ1. Conversely, switch circuit S4 is open during phase φ2 and closed during phase φ1.

As shown in FIG. 4, during phase φ2, flying capacitor Cp and adjustable resistance circuit Radj are couples in series, and the series combination of flying capacitor Cp and adjustable resistance circuit Radj are coupled between node N7 and node N5.

Figure 5:
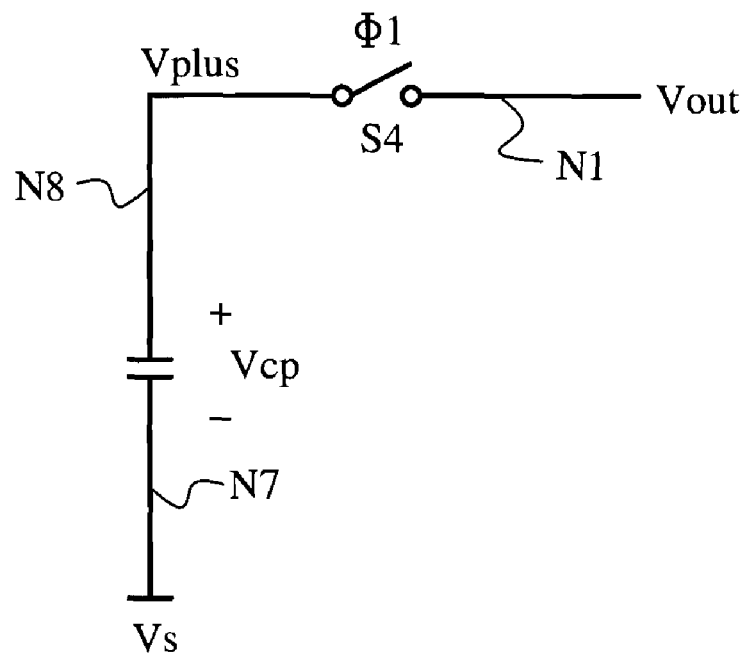
FIG. 5 shows a block diagram of an embodiment of a portion of an embodiment of the charge pump circuit of FIG. 1 during phase φ1 in which a voltage doubler architecture is employed.

FIG. 5 shows a block diagram of an embodiment of capacitor/switch network 510 during phase φ1. Capacitor/switch network 510 is an embodiment of capacitor/switch network 410 of FIG. 4. As shown, during phase φ1, the bottom plate of flying capacitor Cp is coupled to supply voltage Vs, and the top plate of capacitor Cp is coupled to node N1 to provide output voltage Vout.

Figure 6:
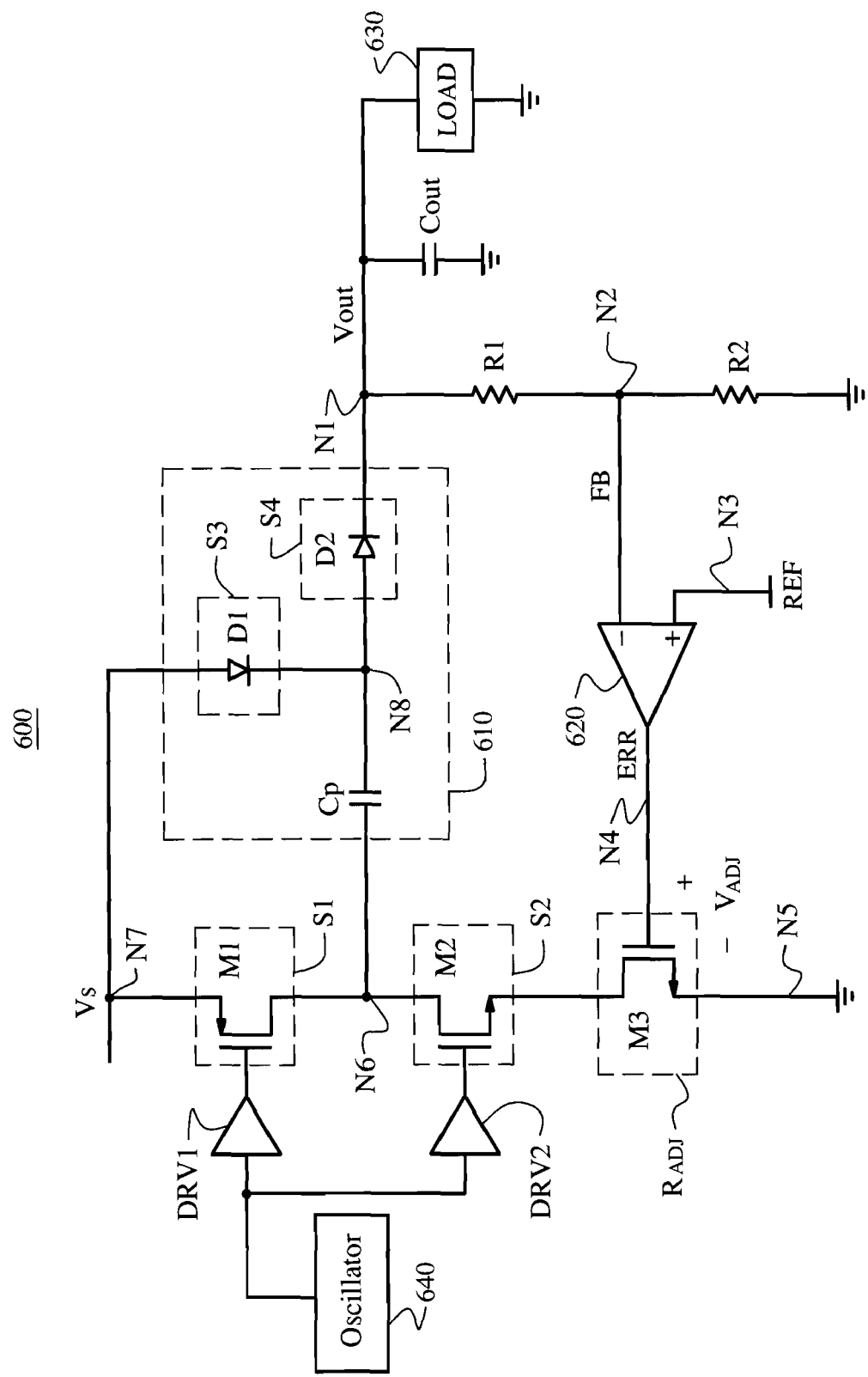
FIG. 6 shows a block diagram of an embodiment of the charge pump circuit of FIG. 1 in which a voltage doubler architecture is employed.

FIG. 6 shows a block diagram of an embodiment of charge pump circuit 100 of FIG. 1 in which an embodiment of a voltage doubler architecture is employed as described with regard to FIG. 4 and FIG. 5 as discussed above. Charge pump circuit 600 further includes oscillator 640, driver DRV1, and driver DRV2. Switch circuit 1 includes transistor M1. Similarly, switch circuit S2 includes transistor M2. Adjustable resistance circuit Radj includes transistor M3. Switch circuit S3 includes diode D1. Further, switch circuit S4 includes diode D2.

Although particular embodiments of switch circuits are shown in FIG. 6, any of the switch circuits may be implemented by a different type of switch within the scope and spirit of the invention. For example, although field effect transistors are used for switches S1 and S2, in other embodiments, bipolar transistors or the like may be used instead. Similarly, although diodes are used for switch circuits S3 and S4, in other embodiments, one or more of the diodes may be replaced with a transistor switch, or the like.

Similarly, although adjustable resistance circuit Radj is implemented with a field effect transistor in the embodiment illustrated in FIG. 6, in other embodiment, transistor M3 may be replaced with a bipolar transistor or another circuit capable of providing a variable resistance based on signal ERR.

Similarly, although FIG. 6 illustrates an embodiment in which transistors M2 and M3 are n-type transistors, and transistor M1 is a p-type transistor, in other embodiments, other types of transistor may be employed. For example, in one embodiment, transistor M3 is a p-type transistor, and reference signal REF is referenced to supply voltage Vs rather than ground. These variations and others are within the scope and spirit of the invention.

Figure 7:
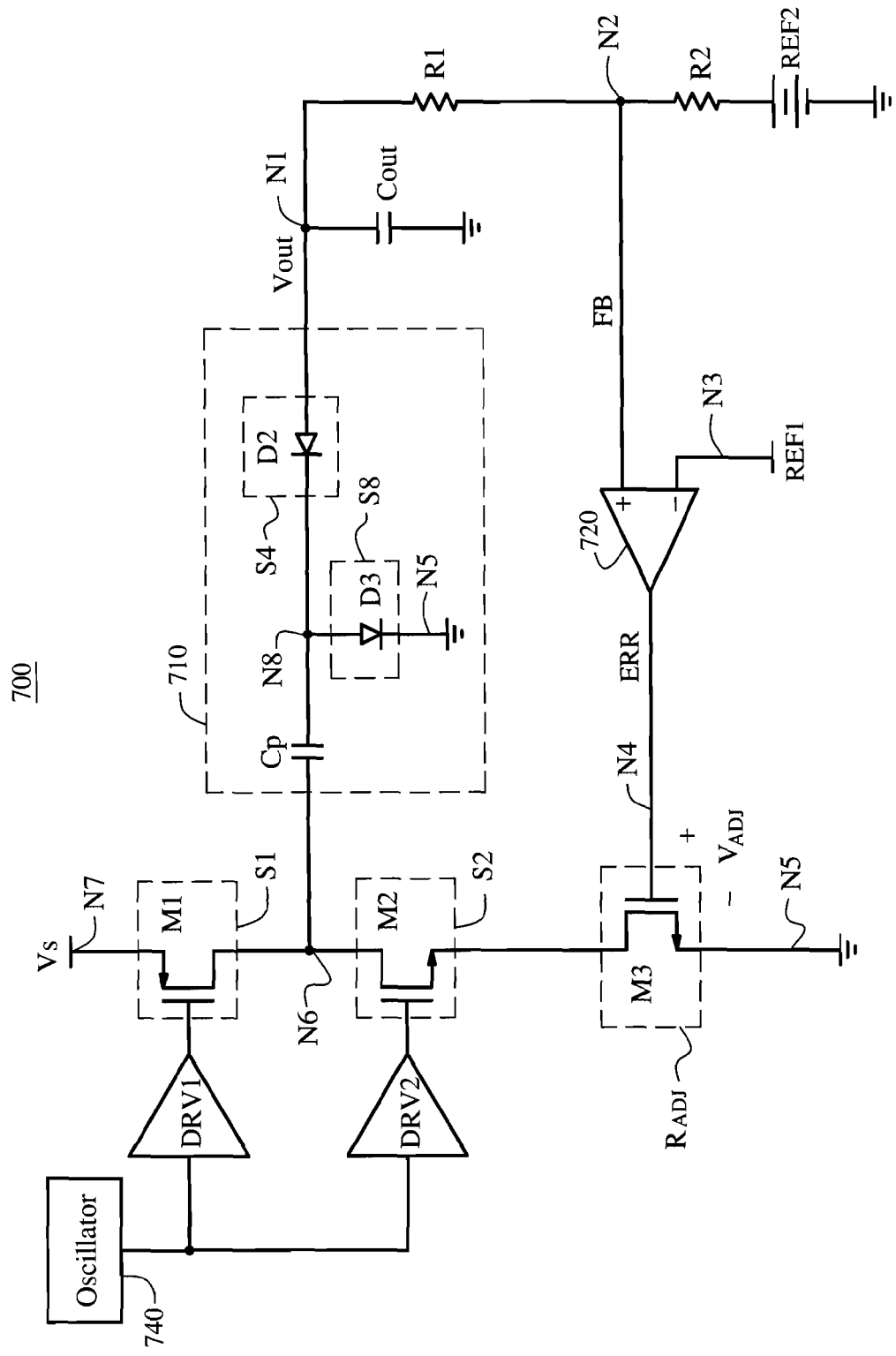
FIG. 7 illustrates a block diagram of an embodiment of the charge pump circuit of FIG. 1 in which a negative charge pump architecture is employed.

FIG. 7 illustrates a block diagram of an embodiment of charge pump circuit 700, in which a negative charge pump architecture is employed. Charge pump circuit 700 further includes reference circuit REF2. Capacitor/switch network circuit 710 includes flying capacitor Cp, switch circuit S4, and switch circuit S8. Switch circuit S4 includes diode D2. Similarly, Switch circuit S8 includes diode D3.

In operation, charge pump circuit 700 may be used to provide a regulated output voltage Vout that is between −1x and 0. During phase φ2, charge pump circuit 700 operates in a similar manner as a voltage doubler architecture. However, during phase φ1, the top plate of flying capacitor Cp is coupled to ground and the bottom plate of flying capacitor Cp is coupled to output node N1.

Figure 8:
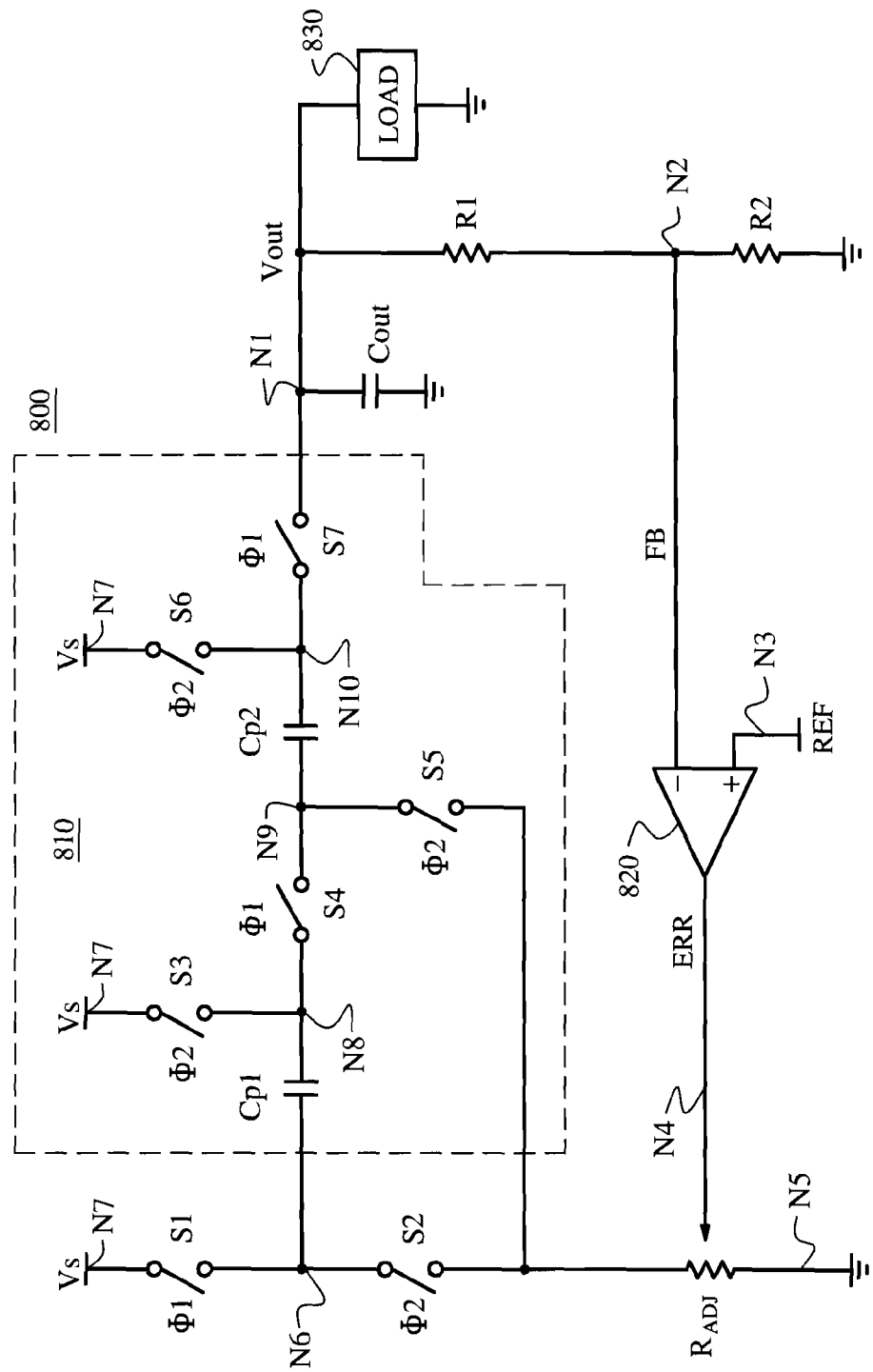
FIG. 8 shows a block diagram of an embodiment of the charge pump circuit of FIG. 1 in which a voltage tripler architecture is employed.

FIG. 8 shows a block diagram of an embodiment of charge pump circuit of 800, in which a voltage tripler architecture is employed. Capacitor/switch network 810 includes flying capacitor Cp1, flying capacitor Cp2, switch circuit S3, switch circuit S4, switch circuit S5, switch circuit S6, and switch circuit S7. Flying capacitor Cp1 is coupled between first flying capacitor node N6 and second flying capacitor node N8. Further, flying capacitor Cp2 is coupled between third flying capacitor node N9 and fourth flying capacitor node N10.

During phase φ1, switch circuits S1, S4, and S7 are closed, and switch circuits S2, S3, S5, and S6 are open. Conversely, during phase φ2, switch circuits S1, S4, and S7 are open, and switch circuits S2, S3, S5, and S6 are closed. Charge pump circuit 800 may be used to provide a regulated output voltage Vout that is between 1x and 3x.

In one embodiment, as shown in FIG. 8, resistor Radj is employed to modulate the voltage across both flying capacitor Cp1 and flying capacitor Cp2 during phase φ2. In this embodiment, resistor Radj is used to modulate the voltage on both flying capacitors with only one control loop, simplifying the design and allows simple building blocks along with a minimum amount of die space.

Figure 9:
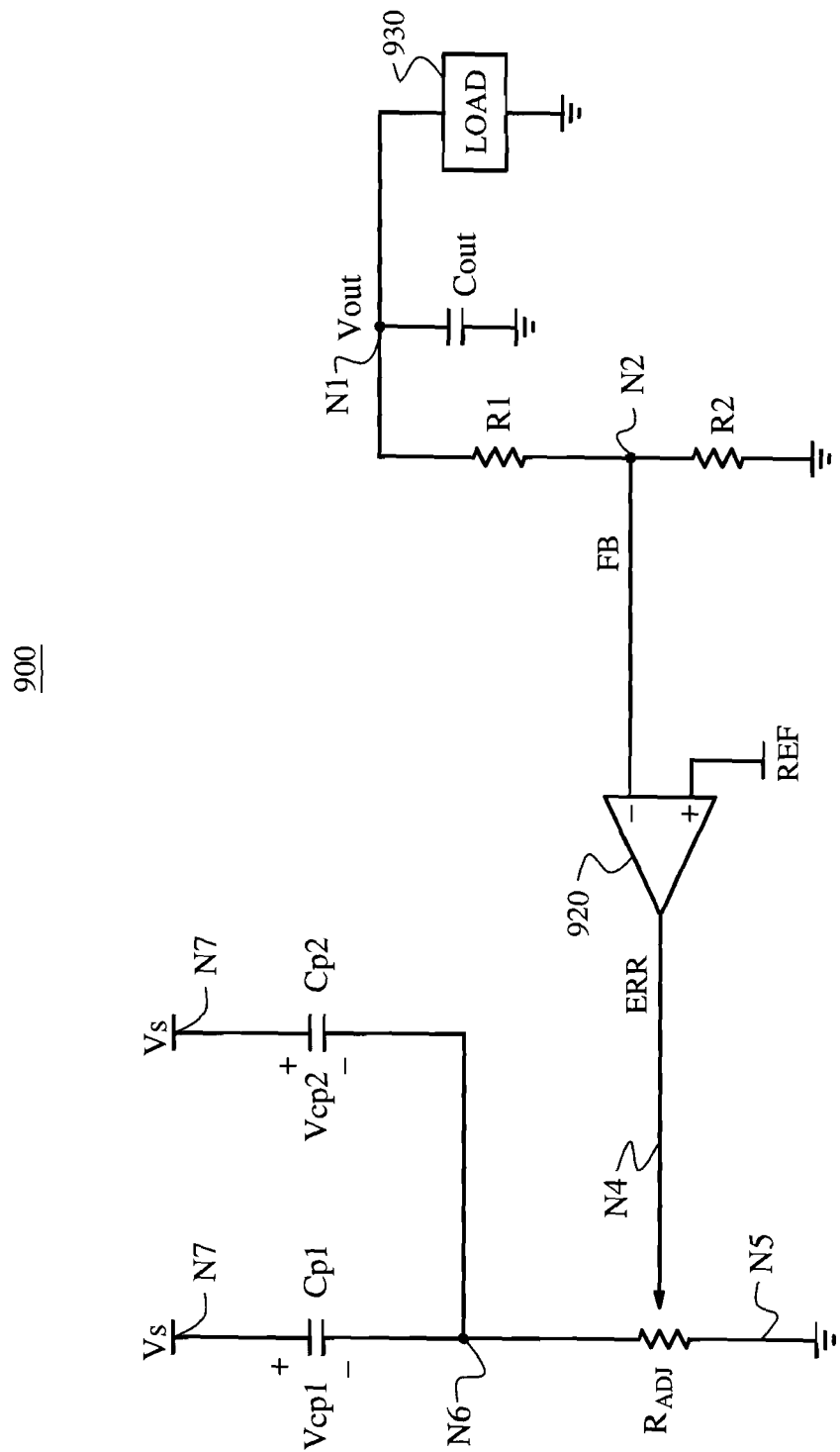
FIG. 9 illustrates a block diagram of an embodiment of the charge pump circuit of FIG. 8 during phase φ2.

FIG. 9 illustrates a block diagram of an embodiment of charge pump circuit 900 during phase φ2. Charge pump circuit 900 is an embodiment of charge pump circuit 800 of FIG. 8. As shown, during phase φ2, flying capacitors Cp1 and Cp2 are coupled in parallel between node N6 and node N7, and adjustable resistance circuit Radj is coupled in series with the parallel combination of the flying capacitors. The voltage Vcp1 across flying capacitor Cp1, and voltage Vcp2 across flying capacitor Cp2, are both modulated based on the resistance of adjustable resistance circuit Radj. Voltages Vcp1 and Vcp2 may be approximately the same; however, there may be some difference due to on-resistance mismatch of the switches. During phase φ1, charge pump circuit 900 provides a voltage of Vs+Vcp1+Vcp2 to output node N1.

Figure 10:
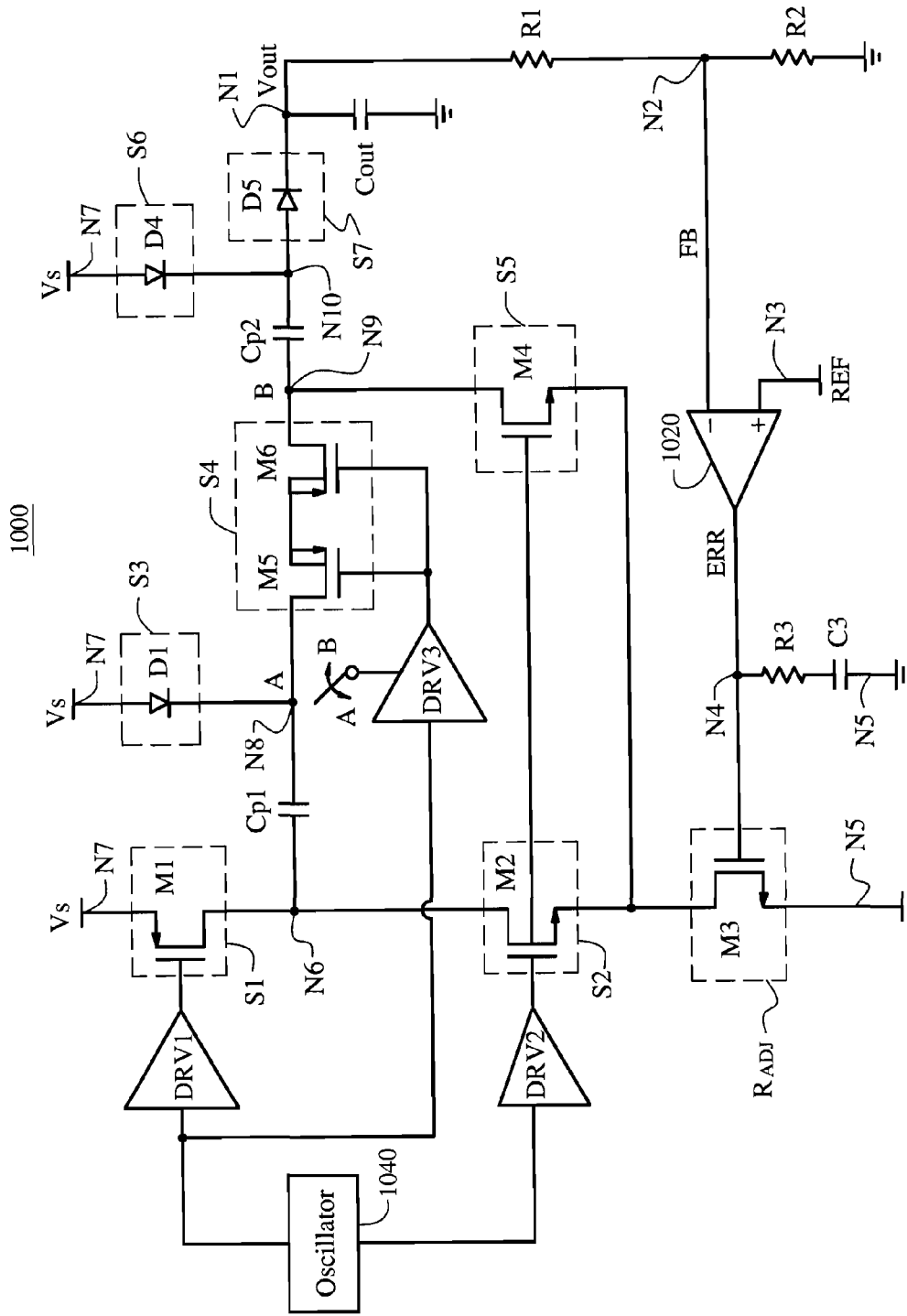
FIG. 10 shows a block diagram of an embodiment of the charge pump circuit of FIG. 8, arranged in accordance with aspects of the invention.

FIG. 10 shows a block diagram of an embodiment of charge pump circuit 1000, which may be employed as an embodiment of charge pump circuit 800 of FIG. 8. Charge pump circuit 1000 further includes driver DRV3, resistor R3, and capacitor C3. Switch circuit S5 includes transistor M4. Switch circuit S4 includes transistors M5 and M6. Switch circuit S6 includes diode D4. Similarly, switch circuit S7 includes diode D5.

Also, resistor R3 and capacitor C3 form a simple compensation network as discussed above.

Although one embodiment charge pump circuit 1000 is illustrated in FIG. 10, many variations are within the scope and spirit of the inventions, such as the variations discussed above, and others. In one embodiment, instead of placing flying capacitors Cp1 and Cp2 in parallel during phase φ2, two different variable resistance circuits may be used, each coupled in series with a separate one of the two flying capacitors during phase φ2. In this example, either one or two error amplifiers may be used.

Further, many different embodiments with different gains are within the scope and spirit of the invention. For example, the 3x architecture shown in FIGS. 8-10 may be expanded resulting in a 4x architecture, a 5x architecture, and so on. Also, a negative charge pump architecture may be employed resulting in a −2x architecture, a −3x architecture, and so on. These variations and others are within the scope and spirit of the invention.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A charge pump circuit, comprising:
    an error amplifier that is operable to provide an error signal that is based, in part, on at least one of an output voltage or a load current;
    an adjustable resistance circuit that is operable such that a resistance across the adjustable resistance circuit is approximately proportional to the error signal, wherein the adjustable resistance circuit is arranged such that the error amplifier drives the adjustable resistance circuit; and
    a plurality of switch circuits that is operable to enable:
        during a sample phase, coupling a flying capacitor in series with the adjustable resistance circuit,
    wherein the plurality of switch circuits includes:
        a first switch circuit that is coupled to a first flying capacitor node;
        a second switch circuit;
        a third switch circuit that is coupled to a second flying capacitor node, wherein the charge pump circuit is arranged to operate with the flying capacitor coupled between the first flying capacitor node and the second flying capacitor node;
        a fourth switch circuit that is coupled between the second flying capacitor node and a third flying capacitor node;
        a fifth switch circuit that is coupled to the third flying capacitor node;
        a sixth switch circuit that is coupled to a fourth flying capacitor node, wherein the charge pump circuit controller is arranged to operate with a second flying capacitor between the third flying capacitor node and the fourth flying capacitor node; and
        a seventh switch circuit that is coupled between the fourth flying capacitor node and an output node.

2. The charge pump circuit of claim 1,
    wherein the plurality of switch circuits are further operable to enable:
        during a hold phase, coupling the flying capacitor to an output capacitor at the output node, wherein the output voltage is provided at the output node.

3. The charge pump circuit of claim 1, further comprising:
    an oscillator circuit is operable to provide an oscillator output signal, wherein a hold phase occurs if the oscillator output signal corresponds to a first level, the sample phase occurs if the oscillator output signal corresponds to a second level
    a first driver circuit that is operable to drive the first switch circuit based, at least in part, on the oscillator output signal, wherein the first switch circuit is closed during the hold phase and open during the sample phase; and
    a second driver circuit that is operable to drive the second switch circuit based, at least in part, on the oscillator output signal, wherein the second switch circuit is open during the hold phase and closed during the sample phase.

4. The charge pump circuit of claim 1, wherein the fourth switch circuit is coupled between the second flying capacitor node and the output node.

5. The charge pump circuit of claim 1, wherein the first switch circuit includes a transistor, the second switch circuit includes a transistor, the third switch circuit is a diode, and the fourth switch circuit is a diode.

6. The charge pump circuit of claim 1, wherein
the charge pump circuit is operable to regulate the output voltage such that the output voltage is substantially equal to VDD*N at steady state, where VDD represents a power supply voltage, and where N represents a pre-determined number that is either greater than two or less than negative one.

7. A charge pump circuit, comprising:
an error amplifier that is operable to provide an error signal that is based, in part, on at least one of an output voltage or a load current;
an adjustable resistance circuit that is operable such that a resistance across the adjustable resistance circuit is approximately proportional to the error signal, wherein the adjustable resistance circuit is arranged such that the error amplifier drives the adjustable resistance circuit; and
a plurality of switch circuits that is operable to enable:
during a sample phase, coupling a flying capacitor in series with the adjustable resistance circuit, wherein the plurality of switch circuits includes:
a first switch circuit that is coupled to a first flying capacitor node;
a second switch circuit;
a third switch circuit that is coupled to a second flying capacitor node, wherein the charge pump circuit is arranged to operate with the flying capacitor coupled between the first flying capacitor node and the second flying capacitor node; and
a fourth switch circuit that is coupled to the second flying capacitor node, wherein the third switch circuit is coupled between the second flying capacitor node and a ground node.

8. The charge pump circuit of claim 7, wherein the charge pump circuit is operable to regulate the output voltage such that the output voltage is substantially equal to VDD*N at steady state, where VDD represents a power supply voltage, and where N represents a pre-determined number between 0 and −1.

9. A method for regulation, comprising:
providing an error signal that is based, in part, on a difference between a feedback signal and a reference signal, wherein the feedback signal is based, at least in part, on at least one of an output voltage or a load current;
employing the error signal to drive an adjustable resistance circuit such that a resistance of the adjustable resistance circuit is modulated based on the error signal;
during a sample phase, coupling a flying capacitor in series with the adjustable resistance circuit;
during a hold phase, transferring charge between the flying capacitor and an output capacitor; and
during the hold phase, transferring charge between a second flying capacitor and the output capacitor, wherein coupling the flying capacitor in series with the adjustable resistance circuit includes coupling the adjustable resistance circuit in series with a parallel combination of the flying capacitor and the second flying capacitor.

10. The method of claim 9, wherein transferring charge between the flying capacitor and the output capacitor includes coupling the flying capacitor between a high power supply node and the output capacitor during the hold stage.

11. A charge pump circuit, comprising:
an error amplifier having at least an output that is coupled to a first node;
an adjustable resistance circuit that is coupled between a second node and a low power supply node, wherein the adjustable resistance circuit is further coupled to the first node;
a first switch circuit that is coupled between a high power supply node and a first flying capacitor node;
a second switch circuit that is coupled between the first flying capacitor node and the second node;
a third switch circuit that is coupled to a second flying capacitor node;
a fourth switch circuit that is coupled between the second flying capacitor node and a third flying capacitor node;
a fifth switch circuit that is coupled to the third flying capacitor node;
a sixth switch circuit that is coupled to a fourth flying capacitor node; and
a seventh switch circuit that is coupled between the fourth flying capacitor node and an output node.

12. The charge pump circuit of claim 11,
wherein the error amplifier is operable to provide an error signal at the first node based, in part, on a difference between a reference signal and a feedback signal; the feedback signal is based, in part, on at least one of an output voltage and a load current; and wherein the adjustable resistance circuit has a resistance that is adjustable based on the error signal.

13. The charge pump circuit of claim 11, wherein
the third switch circuit that is coupled between the high power supply node and the second flying capacitor node.

14. The charge pump circuit of claim 11, wherein
the third switch circuit that is coupled between the high power supply node and the second flying capacitor node;
the fifth switch circuit that is coupled between the third flying capacitor node and the second node; and
wherein the sixth switch circuit that is coupled to between the fourth flying capacitor node and the high power supply node.

15. The charge pump circuit of claim 11, further comprising:
an oscillator circuit;
a first driver circuit that is coupled to the oscillator circuit and the first switch circuit; and
a second driver circuit that is coupled to the oscillator circuit and the second switch circuit.

16. The charge pump circuit of claim 15, wherein
the oscillator is operable to provide an oscillator output signal, a first phase occurs if the oscillator output signal correspond to a first level, a second phase occurs if the oscillator output signal correspond to a second level, the first switch circuit is closed during the first phase and open during the second phase, and wherein the second switch circuit in open during the first phase and closed during the second phase.

17. A charge pump circuit, comprising:
an error amplifier having at least an output that is coupled to a first node;
an adjustable resistance circuit that is coupled between a second node and a low power supply node, wherein the adjustable resistance circuit is further coupled to the first node;

a first flying capacitor that is coupled between a first flying capacitor node and a second flying capacitor node;

a first switch circuit that is coupled between a high power supply node and the first flying capacitor node;

a second switch circuit that is coupled between the first flying capacitor node and the second node;

a first diode that is coupled to the second flying capacitor node; and a second diode that is coupled to the output node.

18. The charge pump circuit of claim 17, wherein the charge pump circuit is operable to regulate an output voltage at the output node such that the output voltage is substantially equal to VDD*N at steady state, where VDD represents a power supply voltage, and where N represents a pre-determined number between 1 and 2.

19. The charge pump circuit of claim 17, wherein the first diode has an anode that is coupled to the high power supply node, and a cathode that is coupled to the second flying capacitor node; and wherein the second diode has a cathode that is coupled to the output node.

20. The charge pump circuit of claim 19, wherein the second diode has an anode that is coupled to the second flying capacitor node.

21. The charge pump circuit of claim 17, wherein the first diode has an anode that is coupled to the second flying capacitor node and a cathode that is coupled to the low power supply node; and wherein the second diode has an anode that is coupled to the output node.

22. The charge pump circuit of claim 21, wherein the second diode has a cathode that is coupled to the second flying capacitor node.

23. A charge pump circuit, comprising:

an error amplifier having at least an output that is coupled to a first node;

an adjustable resistance circuit that is coupled between a second node and a low power supply node, wherein the adjustable resistance circuit is further coupled to the first node;

a first switch circuit that is coupled between a high power supply node and a first flying capacitor node;

a second switch circuit that is coupled between the first flying capacitor node and the second node;

a third switch circuit that is coupled between the low power supply node and a second flying capacitor node; and a fourth switch circuit that is coupled between the second flying capacitor node and the output node.

24. A method for regulation, comprising:

providing an error signal that is based, in part, on a difference between a feedback signal and a reference signal, wherein the feedback signal is based, at least in part, on at least one of an output voltage or a load current;

employing the error signal to drive an adjustable resistance circuit such that a resistance of the adjustable resistance circuit is modulated based on the error signal;

during a sample phase, coupling a flying capacitor in series with the adjustable resistance circuit; and during a hold phase, transferring charge between the flying capacitor and an output capacitor, wherein transferring charge between the flying capacitor and the output capacitor includes coupling the flying capacitor between ground and the output capacitor during the hold stage.

* * * * *

UNITED STATES PATENT AND TRADEMARK OFFICE
CERTIFICATE OF CORRECTION

PATENT NO.       : 7,397,677 B1
APPLICATION NO.  : 11/350674
DATED            : July 8, 2008
INVENTOR(S)      : Michael J. Collins et al.

It is certified that error appears in the above-identified patent and that said Letters Patent is hereby corrected as shown below:

In column 4, line 36, delete "1" and insert -- S1 --, therefor.

Signed and Sealed this

Seventeenth Day of February, 2009

JOHN DOLL
*Acting Director of the United States Patent and Trademark Office*